United States Patent
Zou et al.

(10) Patent No.: US 10,409,517 B2
(45) Date of Patent: Sep. 10, 2019

(54) METHOD AND DEVICE FOR DATA BACKUP

(71) Applicant: EMC IP Holding Company LLC, Hopkinton, MA (US)

(72) Inventors: Colin Yong Zou, Beijing (CN); Kun Wang, Beijing (CN); Sean Cheng Ye, Beijing (CN); Junping Frank Zhao, Beijing (CN); Man Lv, Beijing (CN)

(73) Assignee: EMC IP Holding Company LLC, Hopkinton, MA (US)

( * ) Notice: Subject to any disclaimer, the term of this patent is extended or adjusted under 35 U.S.C. 154(b) by 0 days.

(21) Appl. No.: 15/460,122

(22) Filed: Mar. 15, 2017

(65) Prior Publication Data

US 2017/0269845 A1    Sep. 21, 2017

(30) Foreign Application Priority Data

Mar. 15, 2016    (CN) .......................... 2016 1 0148028

(51) Int. Cl.
*G06F 11/14*    (2006.01)
*G06F 3/06*    (2006.01)

(52) U.S. Cl.
CPC ............ *G06F 3/0641* (2013.01); *G06F 3/061* (2013.01); *G06F 3/067* (2013.01); *G06F 3/0649* (2013.01); *G06F 11/1446* (2013.01); *G06F 11/1456* (2013.01)

(58) Field of Classification Search
None
See application file for complete search history.

(56) References Cited

U.S. PATENT DOCUMENTS

| 8,495,392 B1* | 7/2013 | Bardale | G06F 21/62 711/117 |
| 2013/0318313 A1* | 11/2013 | Clifford | G06F 11/1453 711/162 |
| 2015/0026424 A1* | 1/2015 | Ramesh | G06F 11/1453 711/162 |
| 2015/0032978 A1* | 1/2015 | Bashyam | G06F 17/30159 711/162 |
| 2015/0095596 A1* | 4/2015 | Yang | G06F 3/061 711/162 |

* cited by examiner

*Primary Examiner* — Brian R Peugh
(74) *Attorney, Agent, or Firm* — BainwoodHuang

(57) ABSTRACT

Embodiments of the present disclosure provide a device for data backup comprising: a secondary backup device coupled to a primary backup device, the secondary backup device further comprising: data segmentation unit operable to divide target data to be backed up into a plurality of data segments; data fingerprint generation unit operable to generate a corresponding data fingerprint for each data segment from a plurality of data segments, and providing the data fingerprint to the primary backup device for backing up the target data at the primary backup device, wherein the data fingerprint is a mapped data segment of a length less than a corresponding data segment length.

17 Claims, 8 Drawing Sheets

METHOD AND DEVICE FOR DATA BACKUP

RELATED APPLICATIONS

This application claim priority from Chinese Patent Application Number CN201610148028.9, filed on Mar. 15, 2016 at the State Intellectual Property Office, China, titled "METHOD AND DEVICE FOR DATA BACKUP," the contents of which is herein incorporated by reference in its entirety.

FIELD

Embodiments of the present disclosure generally relate to the field of storage, and more specifically, to a method and device for data backup.

BACKGROUND

In the field of Purpose Built Backup Appliance (PBBA), de-duplication is one of the key techniques. De-duplication is a data compressing operation which intends to remove duplicated data and only back up new data before backing up the data to the backup device, and thereby efficiently reduces occupancy of the repeated/duplicated data in the storage space. De-duplication is a compute intensive process, and includes algorithms of data segmentation, data fingerprint compute, fingerprint index search, etc. Furthermore, as per user requirements, backup appliances usually provide options to compress and encrypt data. High-end CPUs may be used to achieve the purpose. However, such kind of CPUs is very expensive and not suitable for wide use. On the other hand, the software-based solution also contains lots of defects in the aspects of cost, application range and performance.

SUMMARY

In order to solve the problem, embodiments of the present disclosure provide a method and device for data backup. A first aspect of the present disclosure provides a method of data backup, which enables target data segments to pass through a secondary backup device before an original primary backup device for data segmentation and generation of data fingerprints. The method specifically includes: dividing target data to be backed up into a plurality of data segments, at a secondary backup device coupled to a primary backup device; generating a corresponding data fingerprint for each data segment from the plurality of data segments, the data fingerprint being a mapped data segment of a length less than a corresponding data segment length; and providing the data fingerprint to the primary backup device for backing up the target data at the primary backup device.

In certain embodiments, the method further comprises: prior to segmenting the target data, obtaining the target data through protocol processing from client data received at the secondary backup device.

In certain embodiments, generating the data fingerprints comprises generating the data fingerprints by determining corresponding Hash values for the plurality of data segments.

In certain embodiments, the method further comprises: receiving from the primary backup device a first indication of duplicated data segments determined from the plurality of data segments, the data fingerprints of the duplicated data segments matching historical data fingerprints stored in the primary backup device; and removing the duplicated data segments from the secondary backup device in response to reception of the first indication.

In certain embodiments, the method further comprises: receiving a second indication of new data segments determined from the plurality of data segments, the data fingerprints of the new data segments not matching historical data fingerprints stored in the primary backup device; and pre-processing the new data segments in response to reception of the second indication.

In certain embodiments, pre-processing the new data segments comprises at least one of the following: compressing the new data segments; and encrypting the new data segments.

In certain embodiments, the method further comprises: providing the pre-processed new data segments to the primary backup device for storage.

A second aspect of the present disclosure provides a device for data backup, the device comprises a secondary backup device coupled to the primary backup device, the secondary backup device further comprising: data segmentation unit operable to divide target data to be backed up into a plurality of data segments; data fingerprint generation unit operable to generate a corresponding data fingerprint for each data segment from a plurality of data segments, the data fingerprint being a mapped data segment of a length less than a corresponding data segment length; and data communication unit operable to provide the data fingerprint to the primary backup device for backing up the target data at the primary backup device.

A third aspect of the present disclosure provides a computer program product for data backup which is tangibly stored on a non-transient computer readable medium and comprises machine executable instructions, the machine executable instructions, when executed, causing a machine to execute steps of the method in the first aspect of the present disclosure.

It will be appreciated that this Summary is not intended to identify key features or essential features of the claimed subject matter, nor is it intended to be used to limit the scope of the claimed subject matter. Other features of the present disclosure will made apparent through the following description.

BRIEF DESCRIPTION OF THE DRAWINGS

Through the following description with reference to the accompanying drawings, the features and advantages of the present disclosure will become more apparent. In the drawings.

In the drawings, the same or similar reference numbers represent the same or similar elements.

DETAILED DESCRIPTION OF EMBODIMENTS

Figure 1:
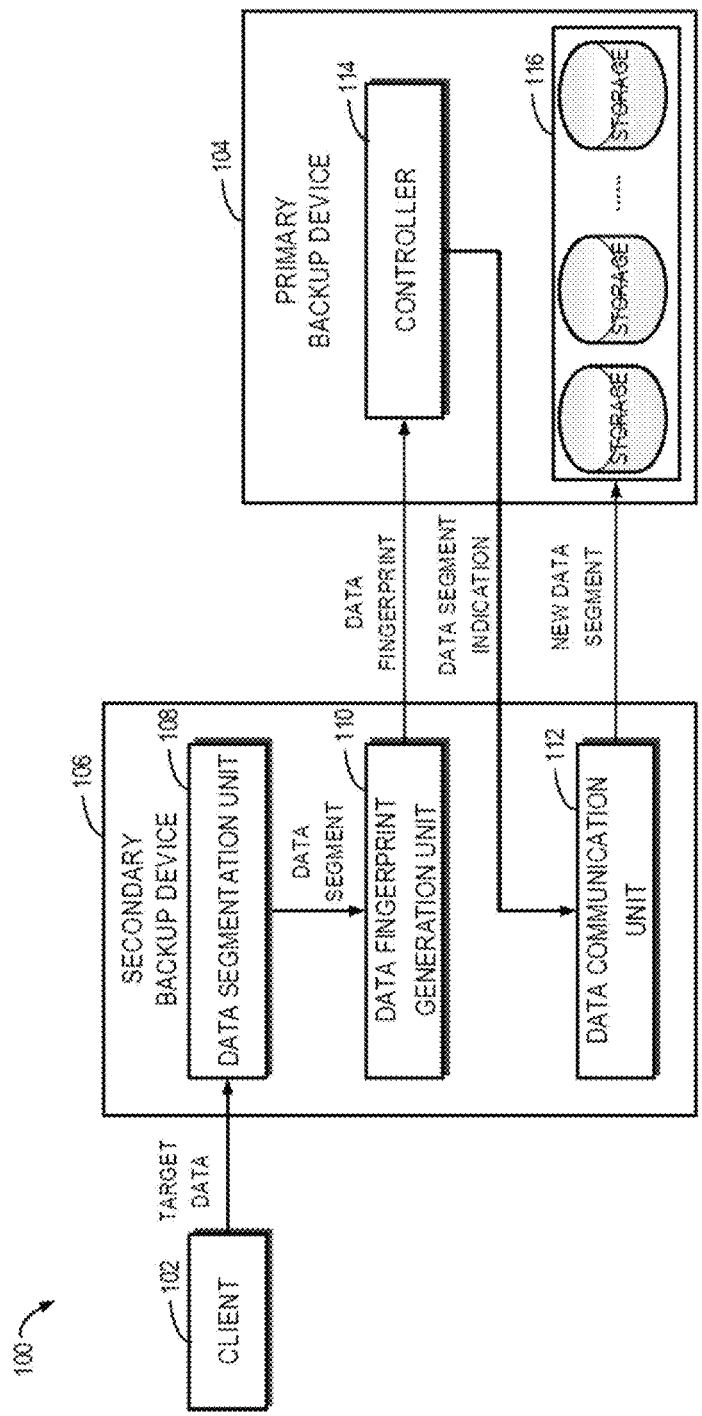
FIG. 1 is a schematic diagram of a system for data backup according to an embodiment of the present disclosure.

Principles of example embodiments disclosed herein will now be described with reference to various example embodiments illustrated in the drawings. It should be appreciated that description of those embodiments is merely to enable those skilled in the art to better understand and further implement the purpose of the present disclosure and is not intended for limiting the scope disclosed herein in any manner. The content of the present disclosure is described herein may be implemented in other manners than those described hereinafter.

As used herein, the term "includes" and its variants are to be read as open-ended terms that mean "includes, but is not limited to." The term "based on" is to be read as "based at least in part on." The term "an embodiment" is to be read as "at least one embodiment." The term "another an embodiment" is to be read as "at least another one embodiment".

FIG. 1 is a schematic diagram illustrating a system 100 for data backup according to an embodiment of the present disclosure. As shown, the system 100 includes a client 102, a primary backup device 104 and a secondary backup device 106 coupled to the primary backup device 104. The primary backup device 104 and the secondary backup device 106 may be coupled to each other, for example, via Ethernet. In FIG. 1, the primary backup device 104 includes a controller 114 and a storage array 116 for storing the backup data. The secondary backup device 106 at least includes data segmentation unit 108, data fingerprint generation unit 110, and data communication unit 112.

According to an embodiment of the present disclosure, in operation, the client 102 may transmit target data to be backed up to the secondary backup device 106, instead of directly transmitting them to the primary backup device 104 as in the traditional solution. The data segmentation unit 108 of the secondary backup device 106 divides the target data into a plurality of data segments. These data segments are subsequently provided to the data fingerprint generation unit 110. The data fingerprint generation unit 110 generates corresponding data fingerprints for the plurality of data segments. Particularly, according to embodiments of the present disclosure, the data fingerprint is a mapped data segment that has a length less than the length of the corresponding data segment but represents the corresponding data segment.

The data fingerprint generation unit 110 then provides the primary backup device 104 with generated data fingerprints. After receiving generated data fingerprints from the data fingerprint generation unit 110 in the secondary backup device 106, the controller 114 in the primary backup device 104 compares each of the received data fingerprints with the existing data fingerprints one by one to determine whether the data segment represented by the data fingerprint is a duplicated data segment or a new data segments. If the data fingerprint matches any one of the existing data fingerprints, it is determined that the corresponding data segment represented by the data fingerprint is a duplicated data segment, and if the data fingerprint does not match any one of the existing data fingerprints, it is determined that the corresponding data segment represented by the data fingerprint is a new data segment. Only when it is determined that the data segment represented by the data fingerprint is a new data segment, the new data segment is transmitted from the data communication unit 112 in the secondary backup device 106 to the storage array 116 in the primary backup device 104. The process is repeated for each data segment of the target data until the backup of the target data at the primary backup device 104 is finally completed.

According to an embodiment of the present disclosure, a part of de-duplication is transferred from the primary backup device 104 to the secondary backup device 106 to improve the de-duplicating performance. In other words, the secondary backup device 106 may act as an "Add-on box" which may be implemented as System-on-Chip (SoC) cards exhibiting a great performance in terms of de-duplication and compression or encrypted algorithm, etc. Besides, no alteration/modification to the primary backup device 104 is needed in the embodiments of the present disclosure, and hence it is beneficial for compatibility and expandability. Further, by using the data fingerprint, it is possible to use only a few bytes (for example, 20 bytes) to represent individual data segments, such that, when the de-duplication is preformed thereafter, it is not necessary to compare each data segment (for example, having an average length of 8 kB) with the existing data segments byte by byte. Rather, only the data fingerprint with a few bytes for representing the corresponding data segment is needed to be compared with the existing data fingerprints. This dramatically decreases the computing complexity of the controller 114 of the primary device 104.

Figure 2:
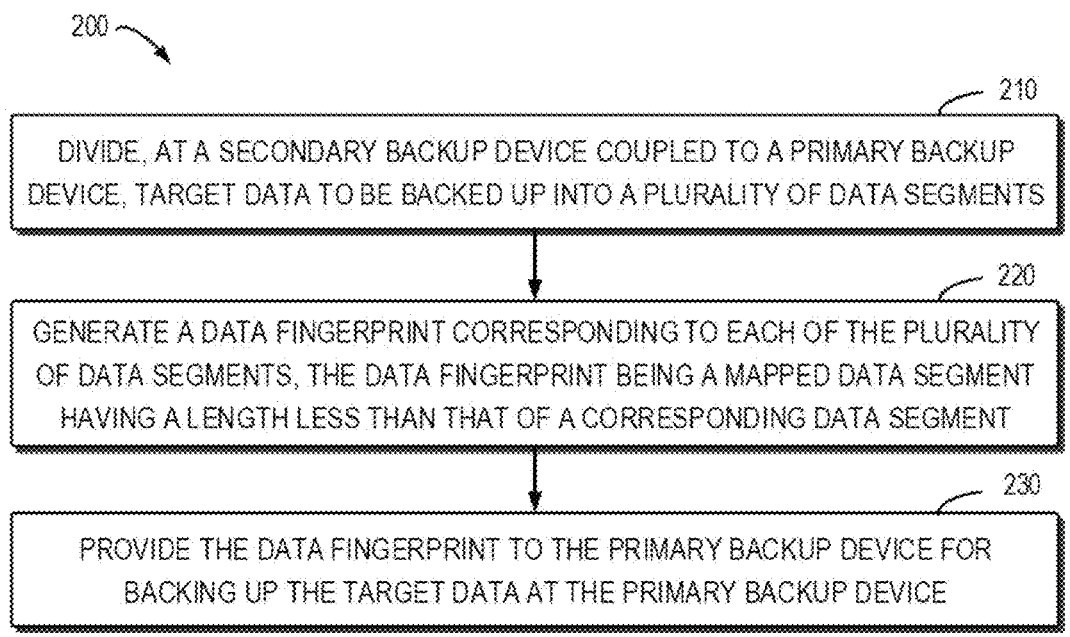
FIG. 2 is a flowchart of a method of data backup according to an embodiment of the present disclosure.

Hereinafter, the function/operation of the secondary backup device 106 is described in details with reference to FIG. 2. Specifically, FIG. 2 is a flowchart of a method 200 for data backup according to an embodiment of the present disclosure. The method 200 may be implemented by the secondary backup device 106.

The method 200 is started at 210, at which the target data to be backed up are segmented into a plurality of data segments at the secondary backup device 106 that is coupled to the primary backup device 104. In some embodiments, dividing (or segmenting) the target data is performed in a manner of non-fixed or varied lengths. This is because the user may only make a minor change to a file (for example, a file having a size of GB), and for example, only a few bytes are added. In this case, if the processing with a predetermined length is used, the following unchanged data segments will be changed accordingly. On the contrary, segmenting at varied lengths may only be focused on those changed data segments adaptively, while with those unchanged data segments being not influenced. In this way, the de-duplicating efficiency is increased correspondingly. It is to be noted that the present disclosure is not intended to limit the algorithm for data segmentation, and any data segmentation algorithm should be covered in the protection scope of the present disclosure.

The method 200 is proceeded to 220, at which corresponding data fingerprints for the plurality of data segments are generated. For example, in some embodiments, a corresponding data fingerprint may be generated for each data segment. Alternatively, generating a common data fingerprint for a plurality of data segments is also possible. The scope of the present disclosure is not restricted in this aspect.

According to an embodiment of the present disclosure, the generated data fingerprint is a mapped data segment having a length less than that of the corresponding data segment. To this end, in some embodiments, the data fingerprints may be generated by determining corresponding Hash values for the plurality of data segments. For example, in one embodiment, the corresponding data fingerprint may be determined for each data segment based on Secure Hash Algorithm SHA1. The data fingerprints obtained using for example SHA1 may reduce the data amount, and meanwhile remarkably decrease an error rate during de-duplication. Moreover, the computing complexity in the controller 114 is reduced as well. It is likewise to be noted that the present disclosure is not intended to limit the algorithm for generating the data fingerprints, and any algorithm for generating the data fingerprints shall be covered in the protection scope of the present disclosure.

Next, at 230, the data fingerprints are provided to the primary backup device 104, so that the primary backup device 104 backs up the target data. As stated above, as the target data segments are first passed through the secondary backup device 106 for performing data-segmentation and generation of the data fingerprints, the primary backup device 104 no longer needs to perform the segmentation operation and, the data fingerprint generating operation. This lightens the workloads of the primary backup device 104 in these aspects.

Figure 3:
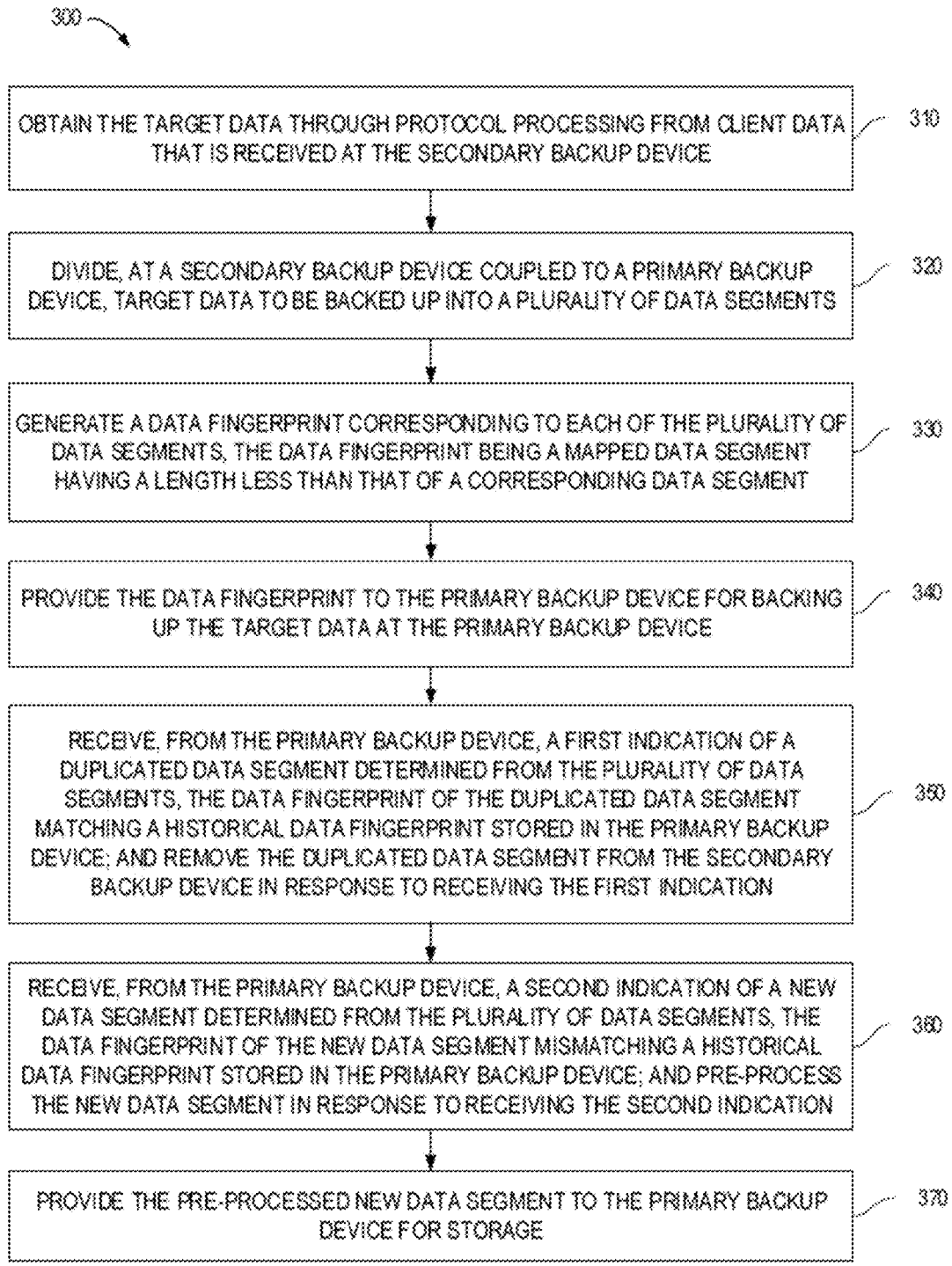
FIG. 3 is a flowchart of a method of data backup according to an embodiment of the present disclosure.

FIG. 3 is a flowchart of a method for data backup according to an embodiment of the present disclosure. 320-340 in the method 300 respectively correspond to 210-230 in the method 200, which thus are omitted herein. Only optional additional steps included in the method 300 are mainly described below.

At 310, prior to segmenting the target data (that is, 210/320), the target data are obtained from the client data that is received at the secondary backup device 106 through protocol processing. The additional protocol processing operation enables to extract the corresponding original data as the target data from client data packets that are input through various interfaces, such as a network interface card interface (NIC) or an fiber channel interface (FC), so as to facilitate the subsequent segmentation.

In some embodiments, the method 300 may further include 350 and 360 after 340. Specifically, at 350, the secondary backup device 106 may receive from the primary backup device 104 a first indication of duplicated data segments deter mined from the plurality of data segments. The term "duplicated data segments" refers to those data segments which have data fingerprints matching the historical data fingerprints stored in the primary backup device 104. In particular, in operation, the controller 114 in the primary backup device 104 searches through all the existing data fingerprints and attempts to find the previously stored data fingerprints matching the input data fingerprints. If a data fingerprint matches any of the existing data fingerprint (also referred to as the hit of the data fingerprint), the controller 114 in the primary backup device 104 determines that the corresponding data segment represented by the data fingerprint is duplicated data segment. In response to reception of the first indication, the duplicated data segment is removed from the secondary backup device 106.

In the traditional de-duplicating technique, it is hard to implement online global de-duplication. This is because the global de-duplication requires a global index search to match the data fingerprints. Some scale-out solutions can only achieve the post-processing of the global de-duplication. On the contrary, in the embodiments of the present disclosure, the data are processed by an efficient online de-duplicating operation prior to being backed up to the primary backup device 104. In such a manner, the occupancy of the duplicated data in the storage space is efficiently reduced, and thus the de-duplicating efficiency and performance are improved accordingly.

Alternatively, or in addition, at 360, the secondary backup device 106 may receive from the primary backup device 104 a second indication of new data segments determined from the plurality of data segments. The term "new data segments" used herein indicates those data segments that do not, match the historical data fingerprints stored in the primary data device 104. Likewise, in operation, if the controller 114 in the primary data backup device 104 has checked all existing data fingerprints and not found any data fingerprint matching the input data fingerprints (also referred to as the data fingerprints being not hit), the controller 114 in the primary backup device 104 determines that the corresponding data segments represented by the data fingerprints are new data segments. In response to the reception of the second indication, the secondary backup device 106 may pre-process the new data segments at 365.

According to an implementation of the present disclosure, at 365, pre-processing the new data segments may include at least one of the following: compressing the new data segments; and encrypting the new data segments. As stated above, since the de-duplicating the duplicated data segments and compressing and encrypting the new data segments are all performed by the secondary backup device 106, it is likewise no longer necessary to perform de-duplicating, compressing and encrypting operations in the original primary backup device 104. This further reduces the loads of the primary backup device 104.

Then, the method 300 is proceeded to 370. At 370, the pre-processed new data segments are provided to the primary backup device 104 for storage, and are backed up in the primary backup device 104. Backing up the data by the primary backup device 104 may be implemented using any technique known at present or to be developed in the feature, which is omitted herein to avoid blurring the subject matter described herein.

Figure 4:
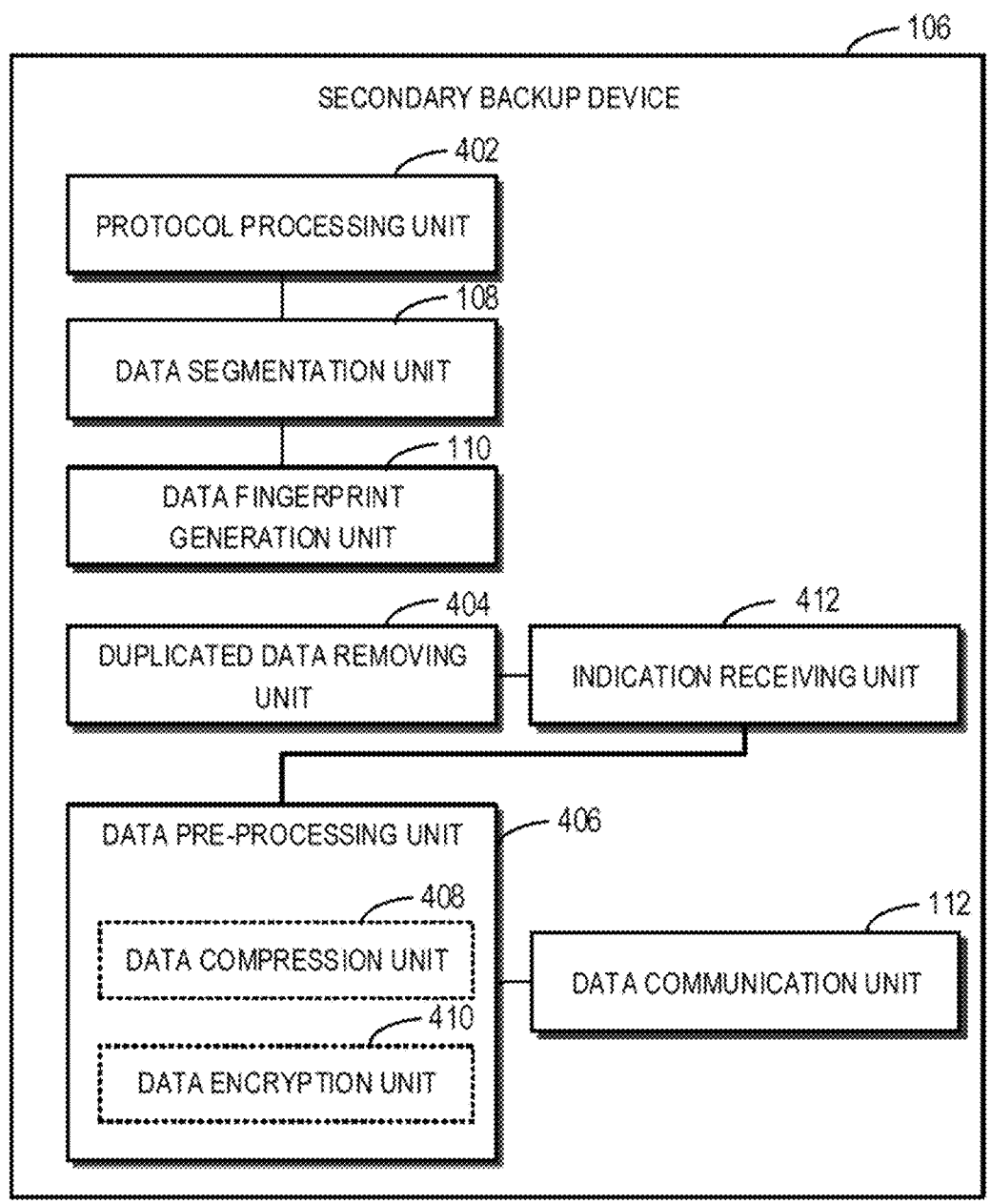
FIG. 4 is a block diagram of a device for data backup according to an embodiment of the present disclosure.

FIG. 4 is a block diagram of a secondary backup device 106 for data backup according to an embodiment of the present disclosure. In the exemplary embodiment as shown in FIG. 4, referring to FIG. 1, the secondary backup device 106 includes data segmentation unit 108. data fingerprint generation unit 110 and data communication unit 112. The data segmentation unit 108 is operable to divide the target data to be backed up into a plurality of data segments. The data fingerprint generation unit 110 is operable to generate a corresponding data fingerprint for each data segment from the plurality data segments. In some embodiments, as stated above, the data fingerprint generating unit may determine corresponding Hash values for the plurality of data segments, and thereby generating data fingerprints. The data fingerprints may be sent by the data communication unit 112 to the primary backup device 104.

In some embodiments, the secondary backup device 106 may include protocol processing unit 402 operable to obtain the target data from the client data that is received at the secondary backup device 106 before segmenting the target data. In some embodiments, the secondary backup device 106 may include indication receiving unit 412 for receiving from the primary backup device 104 a first indication of duplicated data segments determined form the plurality of data segments. Duplicated data removing unit 404 in the secondary backup device 106 may remove the duplicated data segments from the secondary backup device 106 in response to reception of the first indication.

The indication receiving unit 412 may also receive from the primary backup device 104 a second indication of new data segments determined from the plurality of data segments. As a response, data pre-processing unit 406 may pre-process the new data segments. As shown, the new data pre-processing unit 406 may include at least one of the following: data compressing unit 408 for compressing the new data segments; and data encryption unit 410 for encrypting the new data segments. The pre-processed new data segments may be provided by the data communication unit 112 to the primary backup device 104 for storage.

Figure 5:
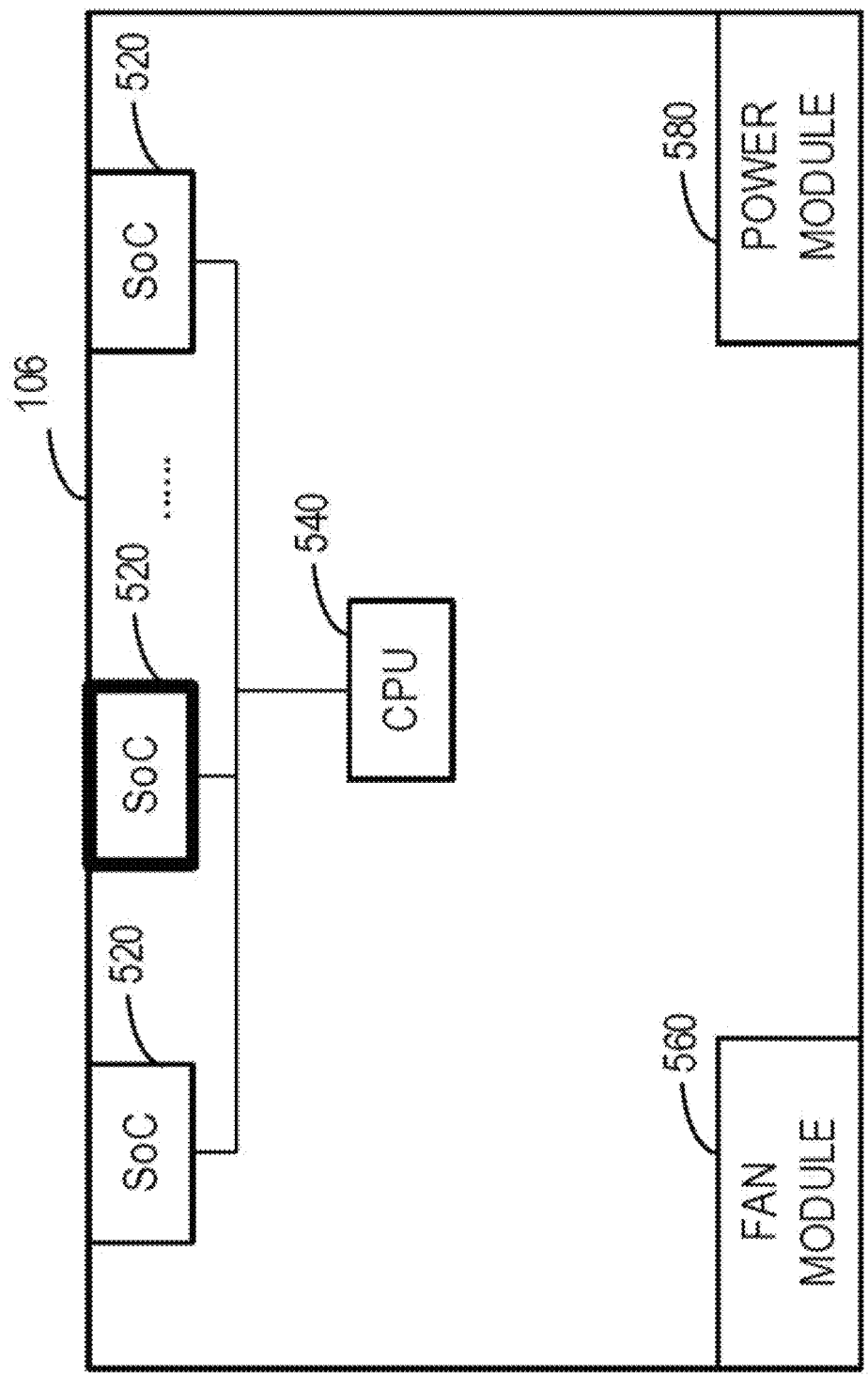
FIG. 5 is a diagram of an inner structure of a secondary backup device comprising a plurality of SoC devices according to an embodiment of the present disclosure.

According to embodiments of the present disclosure, the secondary backup device 106 may be implemented in various manners. For example, in some embodiments, the secondary backup device 106 may be implemented as one or more SoCs. FIG. 5 is a block diagram of a secondary device 106 implemented as a SoC according to an embodiment of the present disclosure.

In the embodiment as shown in FIG. 5, the secondary backup device 106 may be implemented as a SoC card, and it may be, for example, a peripheral component interconnect (PCI) device and may be coupled to a computer via a PCI slot. The secondary backup, device 106 includes a processing unit CPU 540. In some embodiments, the CPU 540 is only provided to manage individual SoC cards 520, and for example, to detect the state of each SoC 520, and thus may be implemented by using a device of a low cost. In addition, the secondary backup device 106 may include a power module 580 for providing electrical power to the whole secondary backup device 106 and a fan module 560 for cooling the whole secondary backup device 106. It is to be noted that, since chips for the compressing or encrypting task runs in the SoC cards, the fan module 506 should provide a power sufficient enough to cool down these SoC cards, or a separate fan module may be provided for each SoC card.

Figure 6:
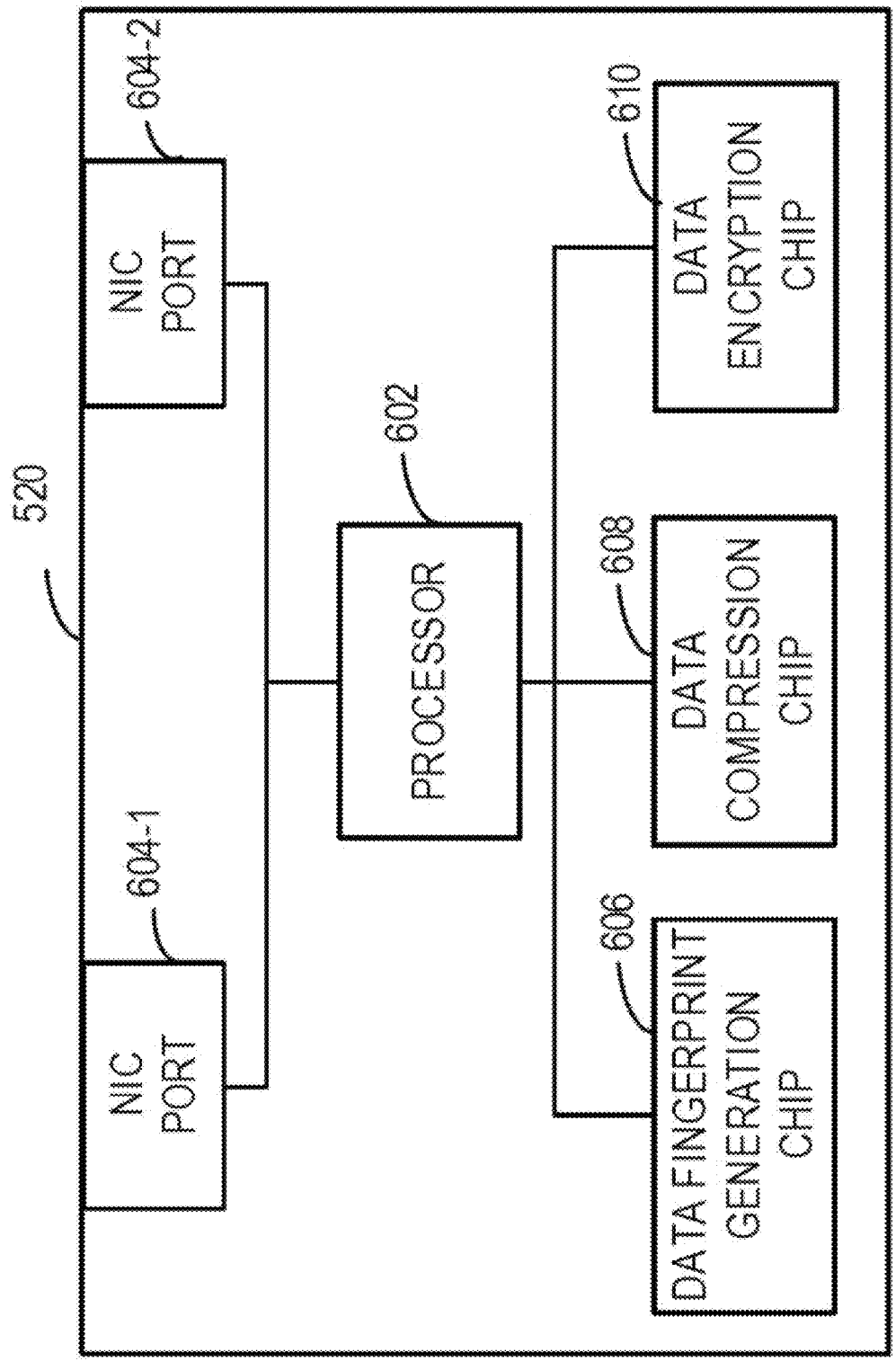
FIG. 6 is a diagram of an inner structure of an SoC device according to an embodiment of the present disclosure.

FIG. 6 is a schematic block diagram of the SoC 520 as depicted in FIG. 5. As shown in FIG. 6, the SoC 520 includes NIC ports 604-1 and 604-2, for connecting to the client to receive the client data and for connecting to the primary backup device 104 to send the new data segments to the primary backup device 104. For example, the NIC port 604-1 is provided for receiving the client data, and the port 604-2 is provided via which the new data is sent to the primary backup device 104. The SoC 520 further includes a processor 602 as the data segmentation unit. In the implementation as shown in FIG. 6, the SoC 520 further includes a dedicated data fingerprint chip 606, a data compression chip 608, and a data encryption chip 610, so as to perform relevant operations in the method 200 or 300 as described above. In other words, the modules for data fingerprint generation, data compression, data encryption, etc. are implemented as chips in this embodiment.

Figure 7:
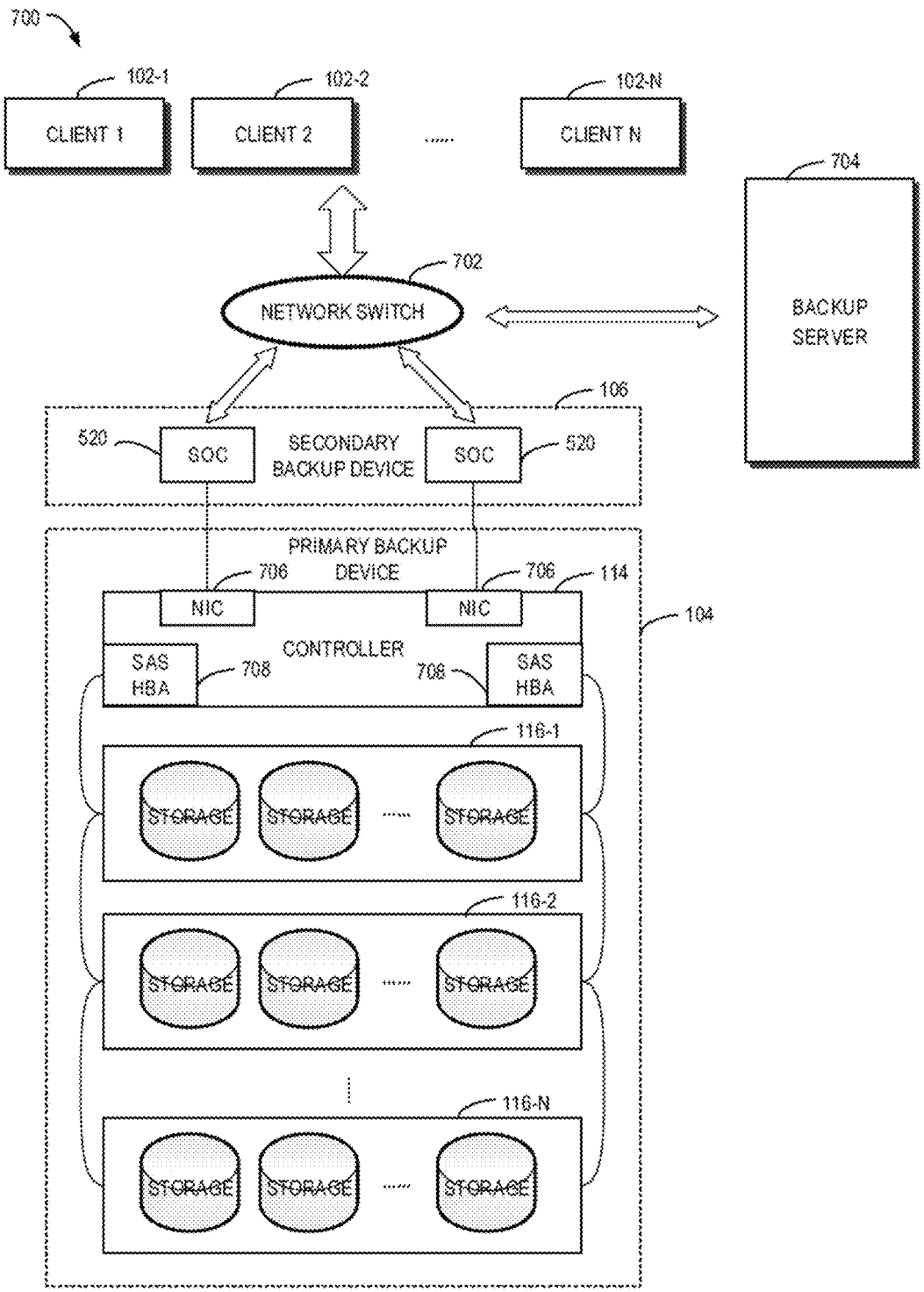
FIG. 7 is a structural diagram of a system for data backup, comprising a plurality of clients and a plurality of storage arrays, according to an embodiment of the present disclosure.

FIG. 7 is a structural diagram of a system 700 for data backup according to an embodiment of the present disclosure. As shown in FIG. 7, the system 700 includes: a plurality of clients 102-1, 102-2 . . . 102-N; a secondary backup device 106, and a primary backup device 104 coupled to the secondary backup device 106. The system 700 also includes a network switch 702, and a backup server 704 for determining which data of which client are to be backed up.

The primary backup device 104 includes the controller 114 as described above and a plurality of memory arrays 116-1, 116-2 . . . 116-N. In the implementation of this exemplary embodiment, the controller 114 includes an NIC interface (or an FC interface) and a serial bus adapter (SAS HBA) 708 for connecting to the plurality of memory arrays. Each of the plurality of memory arrays 116-1, 116-2 . . . 116-N typically has a given number (for example, 10-60) of storage devices (for example, disks). A plurality of arrays is connected to form a "simple disk bundle" (JBOD) to jointly provide a storage space for the backup data. In operation, the secondary backup device 106 may, for example, perform the operations as described above to cooperate with the primary backup device 104, thereby implementing incremental backup of the data.

Figure 8:
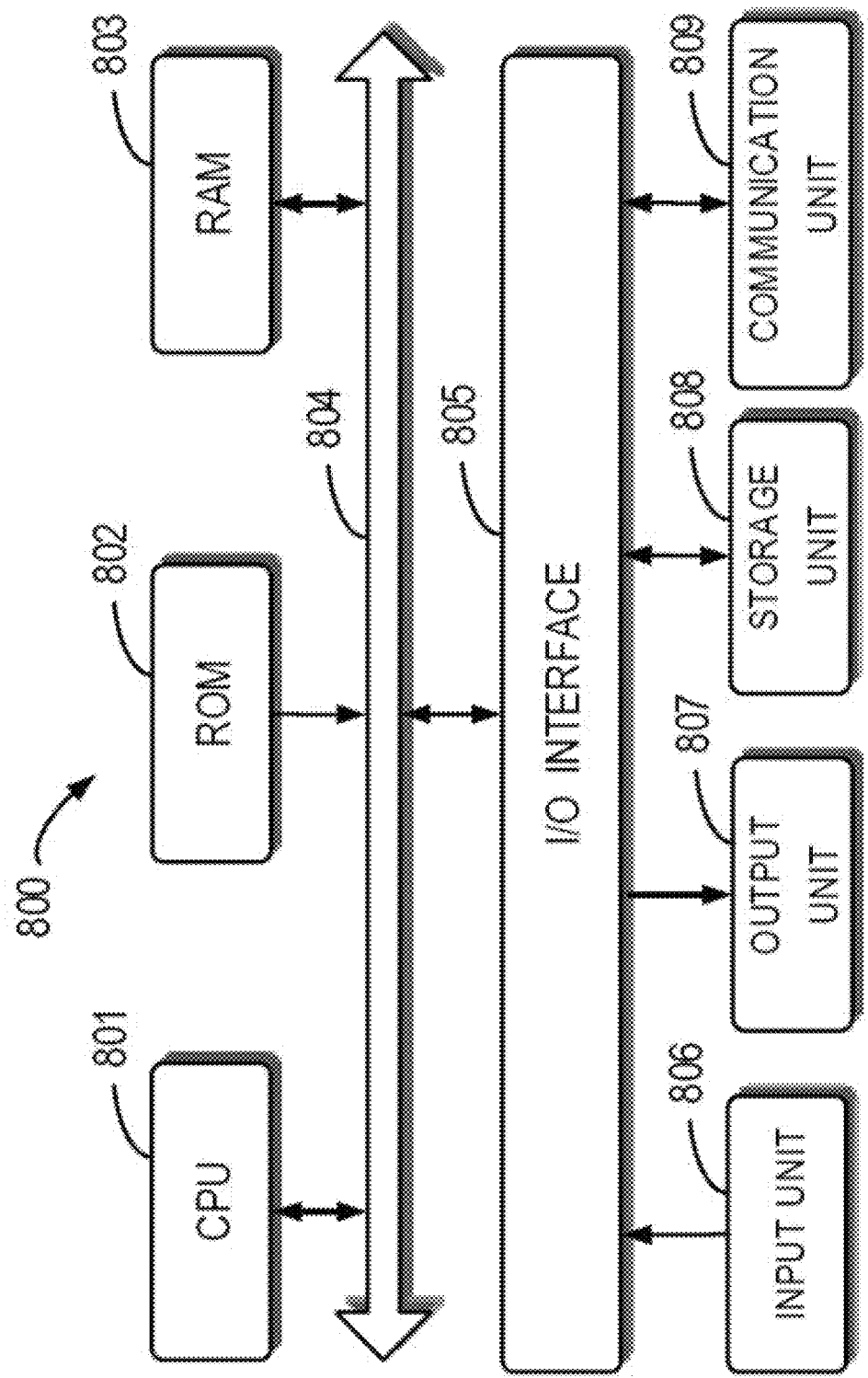
FIG. 8 is a schematic block diagram of a device for implementing an embodiment of the present disclosure.

FIG. 8 is a schematic block diagram of a device 800 according to an embodiment of the present disclosure. For example, the secondary backup device 106 may be implemented in the device 800. As shown therein, the device 800 includes a central processing unit (CPU) 801 which may execute various appropriate acts and processing based on computer program instructions stored in a read-only memory (ROM) 802 or computer program instructions loaded from a storage unit 808 to a random access memory (RAM) 803. In the RAM 803, various programs or data as required for the operations of the device 800 may be stored, CPU 801, ROM 802 and RAM 803 are interconnected via a bus 804. An input/output (I/O) interface 805 is also connected to the bus 804.

A plurality of components in the device 800 connected to the I/O interface 805, includes: an input unit 806, such as a keyboard, mouse, etc.; an output unit 807, such as various types of displays, loudspeakers, etc.; a storage unit 808, such as a disk, optical disk, etc.; and a communication unit 809, such as a network card, modulation regulator, wireless communication receiver, etc. The communication unit 809 allows the device 800 to exchange information/data via, for example, a computer network of Internet and/or various telecommunication networks.

Each process or processing as described above, for example the method 200 and/or 300, may be executed by a processing unit 801. For example, in some embodiments, the method 200 and/or 300 may be implemented as a computer software program which tangibly includes a computer readable medium, such as a storage unit 808. In some embodiments, the computer program may be partially or entirely loaded and/or installed to the device 800 via the ROM 802 and/or the communication unit 809. When the computer program is loaded to the RAM 803 and executed by the CPU 801, one or more steps of the method 200 and/or 300 as described above may be executed.

In conclusion, each embodiment of the present disclosure provides a method and a device for data backup. As some operations, such as data segmentation, compression, encryption, etc., are particularly suitable to be executed by the secondary backup device 106 (for example including a plurality of SoC cards), are transferred to be executed in the secondary backup device 106 to reduce resource occupancy in the CPU, thereby achieving a relatively high backup performance overall. Moreover, by the method of the present disclosure and the data backup operation executed by the device, the data undergo an efficient online de-duplicating operation before being backed up to the primary storage device, and the occupancy of the duplicated data in the storage space is thus efficiently reduced.

In general, various embodiments of the present disclosure may be implemented by hardware or a dedicated circuit, software, logic, or any combination thereof. Some aspects may be implemented by hardware, and some other aspects may be implemented by firmware or software which may be executed by a controller, a microprocessor or other computer devices. Though various aspects of the present disclosure are illustrated or described in block diagrams, flowcharts or some other figures, but it may be understood that the block, device, system, technique or method may be implemented, without limitation, by hardware, software, firmware, dedicated circuit or logic, general hardware or controller or other computing devices or some combinations thereof.

Further, although operations are described in a particular order, it does not mean that the operations are required to be performed in the order as shown or in this sequential order, or all the operations are necessary, in order to produce the desired result. In some circumstances, multi-task or parallel processing may be advantageous. Likewise, though details of several embodiments are included in the above discussion, this does not indicate any limitation to the scope of the present disclosure, and the description of these features is only applied to the specific embodiments. Certain features as described in some separate embodiments may be executed in combination in a single embodiment. On the contrary, various features in the single embodiment may be executed in multiple embodiments separately or in any other appropriate sub-combinations.

Although the present disclosure has been described in specific structural features and/or acts of the method, it should be understood that the technical solution defined in the appended claims is not necessarily limited to the specific features or acts. That is, the above description is only about optional embodiments of the present disclosure. For those skilled in the art, the embodiments of the present disclosure may contain various modifications and alternations. Any modification, equivalent replacement, modification, etc., falling within the scope of the spirits and principles of the present disclosure, is included in the protection scope of the present disclosure.

We claim:

1. A method for data backup, comprising:
    obtaining, by a secondary backup add-on device, target data to be backed up, the secondary backup add-on device being coupled to a primary backup device;
    dividing, by the secondary backup add-on device, the target data into a plurality of data segments;
    generating, by the secondary backup add-on device, a data fingerprint corresponding to each of the plurality of data segments, the data fingerprint being a mapped data segment having a length less than that of a corresponding data segment;
    providing, by the secondary backup add-on device, the data fingerprint to the primary backup device for backing up the target data at the primary backup device;
    receiving, at the secondary backup add-on device from the primary backup device, a first indication of a duplicate data segment determined from the plurality of data segments, the data fingerprint of the duplicate data segment matching an historical data fingerprint stored at the primary backup device; and
    in response to receiving the first indication from the primary backup device, removing the duplicate data segment from the secondary backup add-on device.

2. The method of claim 1, further comprising:
    receiving client data at the secondary backup add-on device,
    wherein the obtaining of the target data to be backed up includes, prior to dividing the target data, obtaining the target data through protocol processing from the client data that is received at the secondary backup add-on device.

3. The method of claim 1, wherein the generating of the data fingerprint comprises:
    generating the data fingerprint by determining corresponding Hash values for the plurality of data segments.

4. The method of claim 1, further comprising:
    receiving, at the secondary backup add-on device from the primary backup device, a second indication of a new data segment determined from the plurality of data segments, the data fingerprint of the new data segment mismatching an historical data fingerprint stored in the primary backup device; and
    in response to receiving the second indication from the primary backup device, pre-processing, by the secondary backup add-on device, the new data segment.

5. The method of claim 4, wherein the pre-processing of the new data segment comprises at least one of:
    compressing the new data segment; and
    encrypting the new data segment.

6. The method of claim 5, further comprising:
    providing, by the secondary backup add-on device, the pre-processed new data segment to the primary backup device for storage.

7. A system, comprising:
    a data storage system including a primary backup device and a secondary backup add-on device,
    wherein the secondary backup add-on device is coupled to the primary backup device; and
    computer-executable program logic encoded in memory of one or more computers enabled for data backup using the data storage system, wherein the computer-executable program logic is configured for the execution of:
        obtaining, by the secondary backup add-on device, target data to be backed up;
        dividing, by the secondary backup add-on device, the target data into a plurality of data segments;
        generating, by the secondary backup add-on device, a data fingerprint corresponding to each of the plurality of data segments, the data fingerprint being a mapped data segment having a length less than that of a corresponding data segment;
        providing, by the secondary backup add-on device, the data fingerprint to the primary backup device for backing up the target data at the primary backup device;
        receiving, at the secondary backup add-on device from the primary backup device, a first indication of a duplicate data segment determined from the plurality of data segments, the data fingerprint of the duplicate data segment matching an historical data fingerprint stored at the primary backup device; and
        in response to receiving the first indication from the primary backup device, removing the duplicate data segment from the secondary backup add-on device.

8. The system of claim 7, wherein the computer-executable program logic is further configured for the execution of:
    receiving client data at the secondary backup add-on device,
    wherein the obtaining of the target data to be backed up includes, prior to dividing the target data, obtaining the target data through protocol processing from the client data that is received at the secondary backup add-on device.

9. The system of claim 7, wherein the generating of the data fingerprint comprises:
    generating the data fingerprint by determining corresponding Hash values for the plurality of data segments.

10. The system of claim 7, wherein the computer-executable program logic is further configured for the execution of:

receiving, at the secondary backup add-on device from the primary backup device, a second indication of a new data segment determined from the plurality of data segments, the data fingerprint of the new data segment mismatching an historical data fingerprint stored in the primary backup device; and in response to receiving the second indication from the primary backup device, pre-processing, by the secondary backup add-on device, the new data segment.

11. The system of claim 10, wherein the pre-processing of the new data segment comprises at least one of:
compressing the new data segment; and
encrypting the new data segment.

12. The system of claim 11, wherein the computer-executable program logic is further configured for the execution of:
providing, by the secondary backup add-on device, the pre-processed new data segment to the primary backup device for storage.

13. A computer program product for data backup, the computer program product comprising:
a non-transitory computer readable medium encoded with computer-executable code, the code configured to enable the execution of:
obtaining, by a secondary backup add-on device, target data to be backed up, the secondary backup add-on device being coupled to a primary backup device;
dividing, by the secondary backup add-on device, the target data into a plurality of data segments;
generating, by the secondary backup add-on device, a data fingerprint corresponding to each of the plurality of data segments, the data fingerprint being a mapped data segment having a length less than that of a corresponding data segment;
providing, by the secondary backup add-on device, the data fingerprint to the primary backup device for backing up the target data at the primary backup device;
receiving, at the secondary backup add-on device from the primary backup device, a first indication of a duplicate data segment determined from the plurality of data segments, the data fingerprint of the duplicate data segment matching an historical data fingerprint stored at the primary backup device; and in response to receiving the first indication from the primary backup device, removing the duplicate data segment from the secondary backup add-on device.

14. The computer program product of claim 13, wherein the code is further configured to enable the execution of:
receiving client data at the secondary backup add-on device,
wherein the obtaining of the target data to be backed up includes, prior to dividing the target data, obtaining the target data through protocol processing from the client data that is received at the secondary backup add-on device.

15. The computer program product of claim 13, wherein the generating of the data fingerprint comprises:
generating the data fingerprint by determining corresponding Hash values for the plurality of data segments.

16. The computer program product of claim 13, wherein the code is further configured to enable the execution of:
receiving, at the secondary backup add-on device from the primary backup device, a second indication of a new data segment determined from the plurality of data segments, the data fingerprint of the new data segment mismatching an historical data fingerprint stored in the primary backup device; and in response to receiving the second indication from the primary backup device, pre-processing, by the secondary backup add-on device, the new data segment.

17. The computer program product of claim 16, wherein the pre-processing of the new data segment comprises at least one of:
compressing the new data segment; and
encrypting the new data segment.

* * * * *